United States Patent [19]

Caporiccio et al.

[11] Patent Number: 4,720,527

[45] Date of Patent: Jan. 19, 1988

[54] NEW FUNCTIONALIZED PERFLUOROPOLYETHERS AND PROCESS FOR THE PREPARATION THEREOF

[75] Inventors: Gerardo Caporiccio, Milan; Gian T. Viola, Ravenna; Giuseppe Marchionni, Milan, all of Italy

[73] Assignee: Ausimont S.p.A., Milan, Italy

[21] Appl. No.: 929,831

[22] Filed: Nov. 13, 1986

[30] Foreign Application Priority Data

Nov. 20, 1985 [IT] Italy ................................ 22920 A/85

[51] Int. Cl.$^4$ ...................... C07C 51/58; C07C 49/04; C08G 65/32
[52] U.S. Cl. ..................................... 525/403; 568/615; 260/544 F; 562/586; 528/485
[58] Field of Search ........................ 525/403; 568/615; 260/544 F; 562/586; 528/485

[56] References Cited

U.S. PATENT DOCUMENTS 2,854,490 9/1958 Fischer et al. .................. 528/485
3,242,218 3/1966 Miller ............................. 568/615
3,847,978 11/1974 Sianesi et al. .................. 568/615

*Primary Examiner*—Harold D. Anderson
*Assistant Examiner*—Dennis R. Daley
*Attorney, Agent, or Firm*—Stevens, Davis, Miller & Mosher

[57] ABSTRACT

A process for the scission of high molecular weight perfluoropolyethers having neutral end groups obtained from photo-oxidation processes of perfluoroolefins, or fluorination of hydrogenated polyalkylene oxides, or by polymerization with opening of the partially fluorinated oxetane ring, said scission being carried out in the presence of catalysts composed of fluorides, oxyfluorides, or oxides of transition metals, or of Al, Sn, Sb, at temperatures ranging from 150° to 380° C.; said scission process leads to the formation of low molecular weight perfluoropolyethers having neutral and acid end groups, the perfluoropolyethereal acids being subjectable to conversion reactions in order to obtain functionalized perfluoropolyethers and to be utilized to provide new polymers.

5 Claims, No Drawings

NEW FUNCTIONALIZED PERFLUOROPOLYETHERS AND PROCESS FOR THE PREPARATION THEREOF

BACKGROUND OF THE INVENTION

1. Field of the Invention

The invention relates to the preparation of low molecular weight perfluoropolyethers through a process for the scission of high molecular weight perfluoropolyethers obtained by photooxidation of perfluoroolefins, or by polymerization with opening of the ring of partially fluorinated oxetane compounds, or by fluorination of hydrogenated polyalkylene oxides.

2. The Prior Art.

It is generally known that the methods employed for the preparation of the above-cited perfluoropolyethers lead to perfluoropolyethers having for the most part a too high molecular weight.

These high molecular weight perfluoropolyethers have limited possibilities of practical uses. Actually it is well known that the appliances in the field of electronics require very low mean molecular weight perfluoropolyethers, while the mean molecular weight perfluoropolyethers are required as operative fluids for high-vacuum pumps.

THE PRESENT INVENTION

An object of the invention is to provide a process for reducing the mean molecular weight of the above said perfluoropolyethers, till bringing it to a desired value, by means of scission of the perfluoropolyethereal chains.

More in particular, the process of the invention relates to the treatment for the scission of perfluoropolyethers of the following classes:

(I) $R_fO(CF_2O)_n R_f$
(II) $A (CF_2CF_2CF_2O)_n B$
(III) $E (C_2F_4O)_m(C_3F_6O)_p (CF_2O)_q$

wherein
n, m, p, q and r are integers;
n varies from 2 to 200;
m varies from 1 to 100;
p, q and r vary from 1 to 100;
the sum $m+p+q+r$ varies from 4 to 400;
$R_f = CF_3$ or $C_2F_5$;
$A = F$, $OR_f$;
B, D = perfluoroalkyls with 1 to 3 C;
$E = F$, $OR'_f$ wherein $R'_f$ is a perfluoroalkyl with 1 to 3 C.

Said scission process comprises heating perfluoropolyethers of formulas (I), (II) or (III) to temperatures from 150° to 380° C. in the presence of a catalyst composed of fluorides, oxyfluorides, or oxides of transition metals selected from Ti, V, Cr, Mn, Fe, Co, Ni, Cu, Zr, Mo, Zn, or of Al, Sn, Sb.

The amount of catalyst utilized varies from 0.1 to 10% by weight referred to the weight of the starting perfluoropolyether.

The process of the invention is utilizable also for the perfluoropolyethers of class (III) which are directly obtained from the photo-oxidation process of the mixture of perfluoroolefins, wherein a part of the end groups are acid groups —COF. In the latter case, greater catalyst amounts as well as higher treatment times and temperatures are used.

Analogously it is possible to utilize, as fluoropolyethers to be subjected to scission, the products of class (II) directly obtained during the oxetane ring opening step, as indicated hereinabove. In such case, the monomeric units are —CH$_2$CF$_2$CF$_2$O—. This polyether is described in European patent publication No. 148,482.

The reaction times can vary over a wide range, for example of the order of from one minute to a few hours, preferably from 3 minutes to 5 hours.

Therefore, by selecting the operative conditions and the characteristics of the catalyst utilized, it is possible to obtain products prevailingly having a predetermined mean molecular weight starting from high molecular weight perfluoropolyethers.

The starting perfluoropolyethers of class (I) can be prepared, for example, according to U.S. Pat. No. 4,534,039; the products of class (II), according to European patent publication No. 148,482; the products of class (III), according to U.S. Pat. No. 3,665,041.

As already mentioned herein, the advantage offered by this process resides in the fact that it is possible to modify the molecular weight distribution of the product resulting from a usual perfluoropolyether preparation method, by enriching it particularly in the most useful fractions; therefore, an important degree of flexibility is imparted to the production process in order to obtain products having a determined molecular weight, on which, as is known, the characteristics of viscosity and of vapor tension of the final products depend.

The determinant conditions to achieve this object are:
(a) maintaining the temperature in the range from 150° to 380° C., as a function of the catalyst nature and amount;
(b) concentration and type of the utilized catalyst.

Catalysts which are suitable for the process according to the invention can be obtained starting from compounds of the above-cited elements, also other than fluorides or oxyfluorides, provided they are capable, under the reaction conditions, of converting at least partially into the corresponding fluorides or oxyfluorides further to the release of fluorine from the perfluoropolyether product to be treated.

In the case of cobalt and nickel it has been ascertained that effective catalysts are represented by the fluorides of the metals at their highest oxidation degree. Good results are obtained also by using different halides of Co and/or Ni at an oxidation degree lower that the maximum one, provided a gaseous fluorine stream is introduced into the reaction vessel, such stream causing the formation in situ of the corresponding fluoride in the highest oxidation state.

Titanium can be usefully employed as TiOF$_2$.

According to a preferred method, this compound is prepared in situ be heating the perfluoropolyether to temperatures higher than 300° C. in an oxygen stream and in the presence of titanium or alloys thereof.

Among the cited oxides, Ti$_2$ and Al$_2$O$_3$ are particularly suited to the process of the invention.

A catalyst particularly suitable for the process according to the invention is represented by aluminium fluoride having specific morphological and structural characteristics. This catalyst is described in detail in a prior Italian patent application No. 21052 A/84 filed by the Applicant.

The catalyst, consisting of AlF$_3$, can be formed also in situ during the reaction by adding anhydrous AlBr$_3$ to the starting perfluoropolyether. Under the reaction conditions, in fact, a substitution of bromine by the fluorine of the perfluoropolyether can take place.

The fluorides and the oxyfluorides are also preparable in situ starting from the corresponding halides, operating in the presence of fluorine.

In the scission process, a decrease in the molecular weights (MW) of the perfluoropolyethers and an increase in acidity take place. The rupture of the ethereal link gives rise to the formation of an acid end group of the type: —(O)CF$_2$COF and —(O)CF$_2$CF$_2$COF for classes (I) and (II), —(O)—CF$_2$COF,

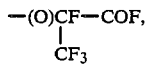
—(O)CF—COF,
  |
  CF$_3$ or keto group

(O)CF$_2$CO
  |
  CF$_3$ for class (III) and a neutral end group of the type of perfluoroalkyl with 1 to 3 C. Oxygen is present in the acid end groups if the end group is not already bound to as oxygen of the chain.

In all cases the resulting product has a molecular weight lower than that of the starting product and a residual acidity that, if it is of interest to obtain a neutral PFPE, can be eliminated by treatment with elemental fluorine in the presence of UV-radiations, as is described in the preceding Italian patent application filed by the Applicant, No. 19498 A/85, or in the absence of UV-radiations at temperatures ranging from 120° C. to 250° C., thus obtaining a fully neutral perfluoropolyether but with a lower mean molecular weight.

Thus, the present invention provides a method for the high-yield conversion of high molecular weight perfluoropolyethers to neutral perfluoropolyethers having a lower molecular weight, which—as explained above—are particularly useful.

Another object of the invention resides in the possibility of obtaining, by the process of the invention, new functionalized perfluoropolyethers having general formulas corresponding to the ones of classes (I) and (II), wherein an end group or both end groups are of the type:
(1) —OCF$_2$COF in class (I), and
(2) —OCF$_2$COF in class (II).

From the scission process illustrated above there are obtained in fact, as previously mentioned, neutral and acid end groups.

The neutral end groups are of the type:
(3) —OCF$_2$CF$_3$
(4) —OCF$_2$CF$_2$CF$_3$.

If the reaction is conducted in the absence of F$_2$, the acid end group can be maximized by reducing the time of contact with the catalyst; conversely, if the reaction is conducted in the presence of F$_2$, the acid end group is almost fully eliminated in consequence of the known neutralization reaction induced by fluorine.

Due to the linearity of the repeating monomeric units, molecules are formed which have at their ends neutral (i.e. perfluoroalkyl) and acid end groups in a substantially unitary ratio, but statistically distributed at the ends of the chains. Therefore, there are present molecules with two neutral end groups of types (3) and (4), molecules with a neutral end group and as acid end group, molecules with two acid end groups of types (1) and (2). If the degradation reaction is not conducted in a proper manner, i.e. as already mentioned, minimizing the contact times of the perfluoropolyether with the catalyst, and under continuous separation, from the reacting mixture, of the low molecular weight products resulting from the reaction, for example by distillation, optionally at reduced pressure, the amount of neutral molecules will increase due to decarbonylation of end groups (1) and (2). The subsequent separation of the acid molecules from the neutral molecules occurs through salification with alkali and subsequent distillation, optionally in a vapor stream.

The residue consists of the alkaline salts of the mono- and di-functional acids, which, by acidification with strong acids, provide the acid perfluoropolyethers with end groups —COOH.

The perfluoropolyethers with acid end groups so prepared can be converted to perfluoropolyethers having other functional groups according to known reactions: for example by conversion of the carboxylic group to amide, esters, which in turn can be converted to other functional groups, such as e.g. nitrile, isocyanate, hydroxyl etc.

Method of preparing several functional groups are described in U.S. Pat. No. 4,094,911.

The functionalized perfluoropolyethers can be utilized as monomers for obtaining polymers, by polyaddition or polycondensation reactions, having low glass transition temperatures $(t_g) < -78°$ C.

The obtainable polymers are for example of the type of the polyesters, polyalcohols, polyurethanes, polyethers, polyamides, polyamines, polyacrylates.

In a particular, advantageous embodiment of the present invention the dissociation process is carried out in such working conditions as to continuously separate from the reaction mixture, the products having a sufficiently low molecular weight. This result is achieved by combining the chemical dissociation treatment with a fractionation treatment, for example by means of distillation or flash separation or molecular distillation of the dissociation product, such treatment being carried out immediately after dissociation or contemporaneously with it.

The following examples are illustrative but not limitative of the invention.

EXAMPLE 1

Into a Hastelloy autoclave having a volume of 20 cm$^3$, heated by means of as oil bath, there were introduced 10 g of a perfluoropolyether having structure CF$_3$(OCF$_2$CF$_2$)$_5$OC$_2$F$_5$ prepared conforming to example 1 of U.S. Pat. No. 4,523,039 and 0.1 g of $\gamma$—AlF$_3$ prepared conforming to example 1 of Italian patent application No. 21,052 A/84. It was heated to a temperature of 240° C. for 10 minutes. The resulting product was then evaporated under vacuum and collected in a trap cooled to −80° C. with dry ice/acetone. The product weighed 9 g and was composed of a mixture of acid and neutral molecules in a ratio of 20:80. An analysis of the mixture revealed that it consisted of molecules:

A (OCF$_2$CF$_2$)$_n$OB with A equal to or different from B and equal to —$CF_3$, $CF_2CF_3$, —$CF_2COF$, with n ranging from 0 to 3.

EXAMPLE 2

Using the same apparatus of example 1 and the same starting perfluoropolyether but 0.1 g of $Ti_2$, the reaction was conducted at 220° C. for 10 minutes, whereafter 9.3 g of a low-boiling product were obtained. The molecule structure was analogous with that of example 1 with the only exception of the different distribution of acid and neutral molecules, the ratio thereof being equal to 3:10.

EXAMPLE 3

Into a metal reactor having a 1200 cc volume, equipped with a stirrer, a heating element, a distillation column and a $CO_2$ trap, suited to uses at pressures between 50 mm Hg and 20 atm., there were introduced 1000 g of a PFPE having the structure:

$$F(CF_2CF_2CF_2O)_{23}CF_2CF_3,$$

prepared according to the procedure of example 14 of European patent application No. 148,482 and having a mean molecular weight of 4000 a.m.u., as well as 10 g of $AlF_3$ of type (1) prepared according to Italian patent application No. 21,052 A/84.

The reagents mixtures was brought to a temperature of 280° C. and was maintained at this temperature for 25 minutes; After cooling and filtration there were recovered in the reactor 700 g of PFPE having a mean molecular weight (MW) equal to 1500 a.m.u., while 200 g of a product having a MW equal to 570 a.m.u. collected in the $CO_2$ trap.

The 700 g of resultant PFPE having a MW=1500 a.m.u. provided, after treatment with alkali and distillation, 490 g of a neutral fraction and 210 g of a mixture of mono- and di-acids, while the 200 g of product with MW=570 a.m.u. resulted to be composed of a mixture in which the acid molecule/neutral molecule ratio was equal to 0.33.

EXAMPLE 4

The same test as described in example 3, conducted under rectification at reduced pressure (50-200 mm Hg) conditions, provided, at a temperature of 270° C. in 25 minutes, 800 g of distillate consisting of perfluoropolyether having a MW equal to 700 a.m.u. and an acid molecule/neutral molecule ratio of 0.45.

EXAMPLE 5

Into a metal 1200-cc reactor, equipped with a stirrer, a heating element and a $CO_2$ trap there were placed 1000 g of the perfluoropolyether utilized in example 3 as a starting product (mean MW=4000) and 10 g of $AlF_3$ of the same type as utilized in example 3.

The temperature was brought to 300° C. and maintained such for 60 minutes.

After heating and filtration there were recovered, in the reactor, 500 g of polyether having a molecular weight equal to 980 a.m.u. The ratio between acid molecules and neutral molecules was of 0.05.

370 g of a perfluoropolyether having a molecular weight of 560 a.m.u. and as acid molecules/neutral molecules ratio equal to 0.25 were present in the $CO_2$ trap.

A 400 g portion of the product with MW=980 a.m.u. so obtained was transferred into a Ni reactor and subsequently neutralized with elemental $F_2$ at a temperature of 150° C. for 18 hours, thus providing neutral PFPE with a yield of 95%.

Fully analogous results were obtained by using $F_2$ and UV-radiations at a temperature of 20° C. for 5 hours on the remaining 100 g.

EXAMPLE 6

Into a Ni reactor having a volume of 1200 cc, equipped with a stirrer, heating elements and a $CO_2$ trap, there were placed 1000 g of the PFPE utilized in example 3 along with 10 g of a mixture of $CoC_2$, $FeCl_2$ and $CrCl_3$ in a weight ratio of 1:3:1.

After having brought the temperature to 300° C. in a nitrogen flow equal to 10 l/h, this was gradually substituted by $F_2$.

After a 10-hours reaction at 120° C., a PFPE sample exhibited a MW=3500 while after further 10 hours the MW was equal to 2900; at the end of the reaction there were collected 800 g of PFPE having a MW=2900 and a residual acidity corresponding to one acid molecule for every 1200 neutral molecules. The resulting product was filtered and then brought to complete conversion of the acid end groups with $F_2$ in a Ni reactor at a temperature of 180° C.

EXAMPLE 7

To 500 g of perfluoropolyether (PFPE) from $C_3F_6$ and $C_2F_4$ having general formula (III) and a viscosity of 1200 cSt, there were added, into a reactor equipped with a stirrer, heating elements and a $CO_2$ trap, 5 g of $AlF_3$ of the same type as described in example 3. After a 20-minutes reaction at a temperature of 300° C. there were collected, after having filtered off the $AlF_3$, 380 g of an oil having a viscosity equal to 45 cSt.

In the dry ive trap, in which the volatile reaction products has gathered, there were recovered 50 g of PFPE having a viscosity of 3 cSt.

Distillation under vacuum with rectification of the acid product having a viscosity of 45 cSt provided 156 g of head products with a viscosity of 7 cSt, which were placed into a cylindrical photochemical reactor of 150 ml volume and were irradiated for 18 hours by means of a Hanau lamp TQ 150 which emitted in the area 250-300 n.m. with a flow equal to $1.5 \cdot 10^{-3}$ Einstein/minute.

After this irradiation time there were obtained 143 g of an oil having a viscosity of 10 cSt and a little residue of acid molecules.

Complete neutralization occurred with KOH at 220° C. in an autoclave according to the method described in British patent No. 1,104,482.

Collected were 130 g of a neutral oil having a viscosity 14 cSt.

EXAMPLE 8

Into a Ni reactor having a 1200 cc volume equipped with a stirrer, heating elements, a $CO_2$ trap, there were placed 1000 g of PFPE of type (III), like the one utilized in example 7, and 10 g of a mixture of $CoCl_2$, $FeCl_2$ and $CrCl_3$ in a ratio of 1:3:1.

After having brought the temperature to 220° C. in a $N_2$ flow equal to 10 l/h, this was gradually substituted by elemental fluorine. After an eleven-hour reaction at 220° C., a PFPE sample exhibited a viscosity of 200 cSt, while after further 12 hours the viscosity was equal to 50 cSt.

On conclusion of the reaction there were collected 850 g of PFPE having a viscosity of 50 cSt and a residual acidity of 0.03 meq/g. The product so obtained was filtered and then completely neutralized through fluorination of acid end groups with elemental fluorine in a nickel reactor at a temperature of 180° C.

EXAMPLE 9

420 g of a mixture of acids prepared according to the modalities of example 3 and having an osmometrically determined molecular weight equal to 1500 a.m.u. was esterified with methanol keeping it under reflux for 5 hours. After elimination of the alcoholic phase, the layer consisting of methyl esters of the perfluoronated acids was purified by vacuum stripping (0.1 torr) at 100° C. for 2 hours.

Obtained were 425 g of methyl esters, which were subsequently reduced to a mixture of mono- and di-functional alcohols with $NaBH_4$, as is described in U.S. Pat. No. 3,814,741.

This alcohol mixture (product B) showed, by titration with acetic anhydride, a functionality corresponding to 1.33 in alcoholic groups.

50 g of the product were solubilized in a mixture of $CF_2Cl$—$CCl_2F$ (Freon 113)/ethyl ether and were additioned with 3.5 g of acryloyl chloride in the presence of the stoichiometric amount in moles of pyridine according to the modalites described in Italian patent application No. 19,629 A/85.

After filtration of pyridine chloride and washing with iced water, there was obtained, with a total yield, the corresponding mixture of acrylates of the perfluoropolyethereal alcohols.

A solution at 5% by weight of the acrylates mixture in Freon 113 was utilized for impregnating a magnetic video tape which, after removal of the solvent, was sujected, at a speed of 30 m/minute, to an electron beam bombardment of an intensity equal to 3 Mrad.

From the electron beam process there was obtained a tape coated by a protective film on which the angle of contact with water was determined: such angle was equal to 120°, while the corresponding angle was equal to 50° for a non-treated tape.

EXAMPLE 10

100 g of product B of example 9 dissolved in Freon 113 and treated with the stoichiometric amount in moles of $NaBH_4$, were subsequantly reacted with 8 g of ethylene oxide at 50° C.; on conclusion of the reaction, the mixture, after washing with water and subsequent drying, provided a product (product D) which exhibited the structure:

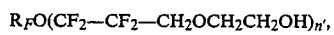

$$R_FO(CF_2-CF_2-CH_2OCH_2CH_2OH)_{n'},$$

wherein $R_F$ = the perfluoroetheral chain described in example 3 and n' = 1 or 2.

50 g of product D was additioned with 17 g of product

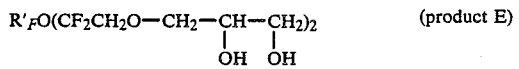

(product E)

wherein $R'_F$ had a structure of the type of Fomblin Z and a MW equal to 1500 a.m.u. (product E), prepared according to the 3M patent (compound VII of U.S. Pat. No. 3,972,856).

50 g of the resulting mixture (product F) were reacted with 5.8 g of toluene diisocyanate at 50° C. for 3 hours. Obtained was a polymer having rubber-like characteristics and a glass transition temperature lower than −80° C.; from such polymer, a test piece was prepared which, subjected to tensile stress, exhibited a tensile strength equal to 20 kg/cm² with an elongation of 450%.

A mixture consisting of 17 g of product D and 17 g of product E was reacted with 5.3 g of toluenediisocyanate and 0.1% by weight of a catalyst based on iron acetylacetonate, at a temperature of 30° C. for 1 hour, thereafter the whole was placed between the plates of a press at 100° C. for 3 hours. A sheet exhibiting a tensile strength of 50 kg/cm² and an elongation of 350% was obtained.

EXAMPLE 11

A mixture of 200 g of mono- and di-acids prepared as is described in example 3 (MW=1500), dissolved in Freon 113, was reacted with 47 g of toluenediisocyanate at 120° C. for 2 hours.

After evolution of $CO_2$ and subsequent cooling, the toluenediisocyanate in excess was washed with toluene; after evaporation and subsequent drying at 50° C. under a vacuum of $10^{-3}$ mmHg there was obtained a product which, on analysis, revealed to be:

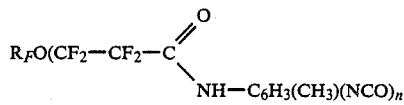

where n=1 or 2 and $R_F$=the perfluoropolyethereal chain described in example 3. The presence of isocyanic groups was confirmed also by titration with butylamine.

20 g of this product were dissolved with 0.05 g of potassium acetate, obtaining a mixture which was utilized for spreading a 100 Å thick film onto a rigid megnetic disc, type Winchester, which was placed into an oven at a temperature of 100° C. and left there during 10 hours.

A polymeric film endowed with excellent wear-resisting properties and exhibiting a static friction coefficient equal to 0.2 was obtained on the disc surface.

EXAMPLE 12

50 g of ethoxylated alcohols (product D of example 10) dissolved in a solvent mixture consisting of Freon 113, acetone and t.butanol in a volume ratio of 1:1:1, were additioned with 9.1 g of phenyl-bis-1,3-(hexafluoropropylidene) alcohol, 10 g of epichlorohydrin and 7 g of NaOH.

The reagent mixture was kept at reflux for 8 hours, thus obtaining a very viscous product which, analyzed by means of a rotary viscosimeter, exhibited a viscosity of 4000 poises at 50° C.

A 50 g portion of the epoxy polymer so obtained was mixed with 1 g of ethylenediamine and placed between two plates of a press at 60° C., where is was kept for 3 hours.

A rubber-like sheet was obtained, from which a test piece was prepared which, under tensile stress, exhibited a tensile strength equal to 50 kg/cm² and as elongation of 350%.

What is claimed is:

1. A process for the scission of perfluoropolyethers of the following classes:
   (I) $R_fO(CF_2CF_2O)_nR_f$
   (II) $A(CF_2CF_2CF_2O)_nB$ (III) $E(CF_2CF_2O)_m(C_3F_6O)_p(CF_2O)_q$ $$\underset{CF_3}{(CFO)_r}D$$

wherein n, m, p, q, r are integers:
n varies from 2 to 200,
m, p, q and r vary from 1 to 100,
the sum m+p+q+r varies from 4 to 400,
$R_f = CF_3$ or $C_2F_5$,
A = F, $OR_f$,
B, D = perfluoroalkyls with 1 to 3 C,
E = F, $OR'_f$ where $R'_f$ is a perfluoroalkyl having 1 to 3 C; which comprises heating the perfluoropolyethers of formulas I, II or III to temperatures ranging from 150° to 380° C. in the presence of a catalyst composed of fluorides, oxyfluorides or oxides of the transition metals selected from among Ti, V, Cr, Mn, Fe, Co, Ni, Cu, Zr, Mo, Zn or of Al, Sn, Sb.

2. The process according to claim 1, characterized in that the scission is carried out in the presence of fluorine.

3. The process according to claim 1, characterized in that the catalyst amount ranges from 0.1 to 10% by weight referred to the starting perfluoropolyether.

4. The process according to claim 1, wherein the scission products are continuously removed from the reacting mixture by distillation.

5. Neutral perfluoropolyethers having a low molecular weight, prepared according to the process of claim 1 or 2.

* * * * *